(12) United States Patent
Davar et al.

(10) Patent No.: US 10,062,098 B2
(45) Date of Patent: Aug. 28, 2018

(54) RECOMMENDATION ENGINE

(71) Applicant: 0934781 B.C. Ltd., Vancouver (CA)

(72) Inventors: Ali Davar, Vancouver (CA); Simon James Hewitt, Vancouver (CA); David Robert Thompson, Vancouver (CA)

(73) Assignee: 0934781 B.C. Ltd, Vancouver (CA)

( * ) Notice: Subject to any disclaimer, the term of this patent is extended or adjusted under 35 U.S.C. 154(b) by 0 days.

(21) Appl. No.: 15/684,348

(22) Filed: Aug. 23, 2017

(65) Prior Publication Data

US 2017/0352089 A1 Dec. 7, 2017

Related U.S. Application Data

(62) Division of application No. 14/537,092, filed on Nov. 10, 2014, now Pat. No. 9,773,272.

(51) Int. Cl.
*G06Q 30/06* (2012.01)
*G06Q 30/02* (2012.01)

(52) U.S. Cl.
CPC ..... *G06Q 30/0631* (2013.01); *G06Q 30/0282* (2013.01)

(58) Field of Classification Search
CPC .................................................... G06Q 30/06
USPC ...................................................... 705/26.1
See application file for complete search history.

(56) References Cited

U.S. PATENT DOCUMENTS

| | | |
|---|---|---|
| 2008/0235216 A1 | 9/2008 | Ruttenberg |
| 2012/0173541 A1* | 7/2012 | Venkataramani ... G06F 17/3048 707/747 |
| 2013/0332862 A1* | 12/2013 | Mirra ...................... G06O 40/06 715/760 |
| 2014/0280224 A1 | 9/2014 | Feinberg |
| 2014/0315584 A1 | 10/2014 | Cheng |
| 2014/0365313 A1* | 12/2014 | Reese ................ G06Q 30/0269 705/14.66 |
| 2015/0095121 A1 | 4/2015 | Bastian |
| 2015/0106244 A1 | 4/2015 | Lo Faro |
| 2015/0142899 A1* | 5/2015 | Birney ..................... H04L 51/32 709/206 |
| 2015/0254371 A1* | 9/2015 | Zhang ................... H04L 67/306 707/798 |
| 2015/0379445 A1* | 12/2015 | Wang ............... G06Q 10/06311 705/7.13 |
| 2016/0063037 A1* | 3/2016 | Savkli ............... G06F 17/30277 707/722 |
| 2016/0110774 A1 | 4/2016 | Ahn |
| 2016/0127195 A1* | 5/2016 | Ripley ................. H04L 41/145 709/224 |
| 2017/0116200 A1* | 4/2017 | Berkhim ............. G06F 17/3053 |

* cited by examiner

*Primary Examiner* — Mila Airapetian

(57) ABSTRACT

A computer method and system provide means for recommending an organization to a user. The system includes a database of business relationships between organizations. A user may search for an organization according to search criteria and the system will select a set of organizations that match the criteria. The organizations may be displayed based on the relevance of the selected organization and the similarity of organizations connected to the selected organizations.

9 Claims, 10 Drawing Sheets

[70]

XYZ Marketing

XYZ Marketing is a boutique marketing firm, specializing in the creating unique campaigns for food and drink brands. We have offices in Vancouver and Austin 12 Employees $20m Annual Revenue Specialties:
- Food and Drink
- TV Advertizing
- Print advertizing Founded in 1990

Recent Activity

*Today* - XYZ Marketing added Coca Cola as a Client
*Yesterday* - XYZ Marketing added 2 clients in Food Production
*3 days ago* - XYZ Marketing updated their specialties
*1 week ago* - XYZ Added Global PR Associates as a Partner

34 Clients

Named Clients
- Coca Cola
- Pepsi
- Pacific Metals
- Goliath Bank
- Fairy Cakes Ltd

Average Client spend over time

Client size distribution

20 B2B Clients
15 B2C Clients

12 Clients in Vancouver

8 Clients in Seattle

4 Partners

Named Partners
- XYZ PR
- Global PR Associates 2 other partners in the PR industry

Fig 5

PR Services 102

Search Filters: 103

Vendor Industries: Public Relations, Marketing
Client Size: 1-10 employees, 11-100 employees, 101+ employees
Client Specialties: Food & Drinks, Distribution
Client Locations: Vancouver, San Francisco, Austin
☑ B2B
☐ B2C

Search Results 115

| XYZ Marketing<br><br>*Marketing*<br><br>*Vancouver, Austin* | 34 Clients<br>- Coca Cola<br>- Pepsi<br>- Pacific Metals<br>- Goliath Bank<br>- Fairy Cakes Ltd<br>*and 29 others* | 7 clients with 1-10 employees | 4 clients in Austin |
| --- | --- | --- | --- |
| | | 20 B2B clients | 12 clients in Vancouver |

| SF Public Relations<br><br>*Public Relations*<br><br>*San Fransisco* | 12 Clients<br>- Sysco<br>- Cheney Bros<br>- LA Food<br>- International Pies<br>- Banta Food<br>- Trout River Ltd<br>- Big Bagels<br>- Moreish Drinks<br>*and 4 others* | 3 clients with 1-10 employees | 6 clients in San Francisco |
| --- | --- | --- | --- |
| | | 10 B2B Clients | |

| AB PR<br><br>*Public Relations*<br>*Vancouver* | 2 Clients<br>2 others, not visible | 2 clients in Vancouver | |
| --- | --- | --- | --- |

*... and 20 more results*

Fig. 6

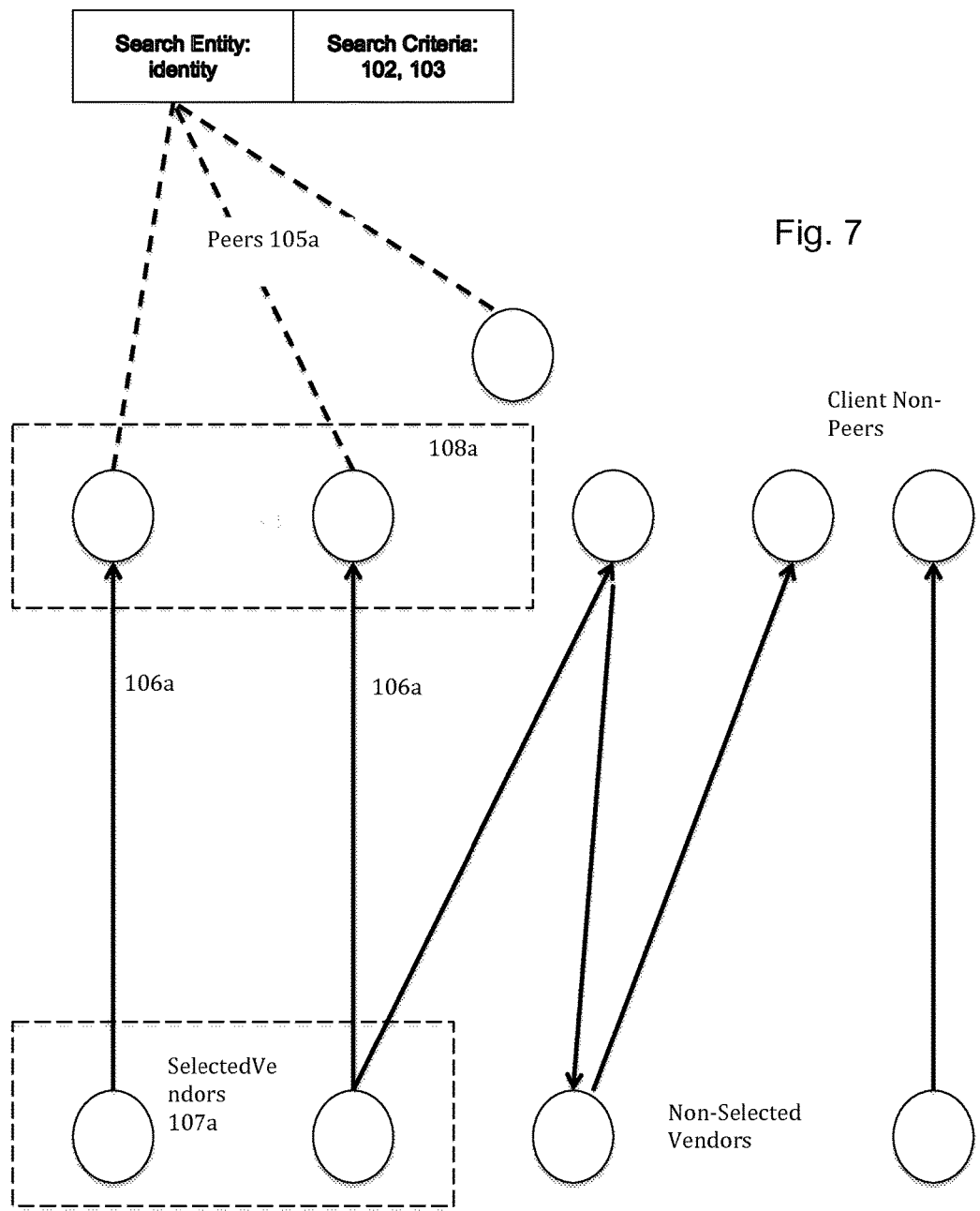

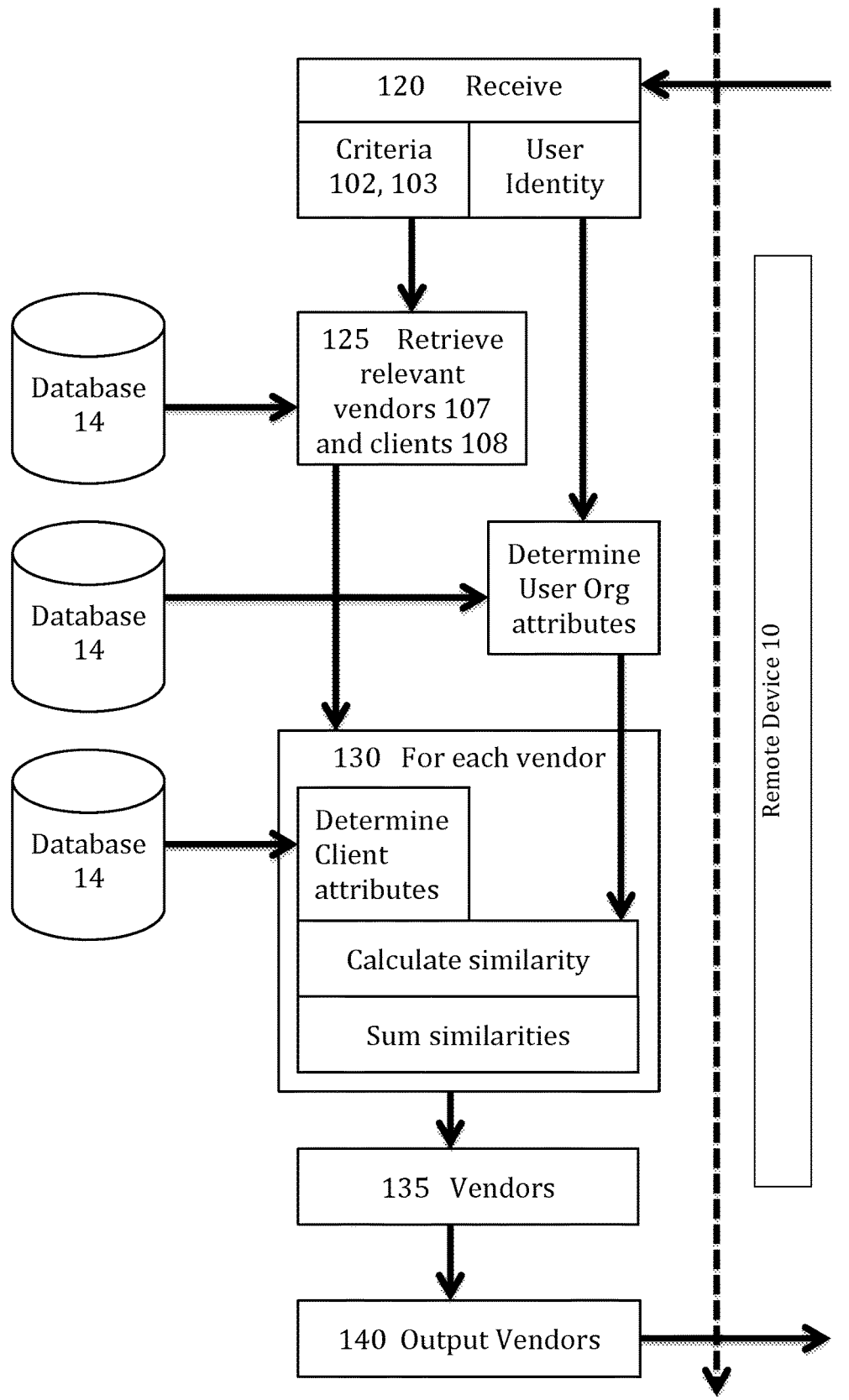

RECOMMENDATION ENGINE

CROSS-REFERENCE TO RELATED APPLICATIONS

This application is a divisional application of U.S. patent application Ser. No. 14/537,092, filed on Nov. 10, 2014, entitled "RECOMMENDATION ENGINES" the entire contents of which are hereby incorporated by reference.

TECHNICAL FIELD

The present disclosure relates to methods for operating a system and database of business relationships between organizations. Certain methods are useful for selecting, processing and outputting relationship data, particularly data that is relevant to a particular organization. The system may comprise a computer network accessible via the Internet.

BACKGROUND

Business typically requires a multitude of businesses to work together, wherein there are many involved in a supply chain, many acting as service providers, advisors, brokers and of course customers to pay for it all. To be successful, a business is required to identify and assemble a network appropriate to service the business at each point. In many cases an organization will have an established network; however, there is commonly a need for an organization to locate a new supplier, partner, client, or buyer. These can be easily found with reference to an Internet search engine or phone directory. Dedicated websites currently exist to provide a user with a list of businesses according to a particular industry or service/product offered.

However, this does not help the searcher determine which potential supplier/client is the best or most relevant to themselves. By human nature it is common to ask who is used and trusted by other businesses that are respected by the searcher.

This information is usually only known to those with years of experience, are well connected or who have access to specialist business directories. In some cases relationships can be determined from online or physical records but it is not always possible to know the nature, trust, strength, or present activity of the relationship. The search is typically made against some criteria such as location or sector. Even with knowledge of these relationships, it is not a simple matter to search by certain criteria, filter certain categories or weigh large amounts of such data.

Existing platforms attempt to solve this problem by creating searchable directories of businesses and/or providing reviews from other users. In some instances, the list is ranked according to a metric such as size or revenue. In these cases the user must judge what review or metric might be suitable for their own business. Most recently, classes of programs called Recommendation Systems look for similarity between users to recommend products and services.

The present inventors have appreciated an opportunity to address these issues by creating a database of business relationships, whereby the strength of such relationships and similarity of businesses rather than users provides a basis for making a recommendation of an organization, products and services.

BRIEF SUMMARY OF THE INVENTION

The inventors have envisaged a database, network, system, and methods for operating with data about business relationships.

According to a first aspect of the inventions there is provided a computer-implemented method of recommending organizations from a database recording business relationships between organizations. The method comprises using a computer processor, determining identification data or attribute data of a first organization for which a recommendation of second organizations is sought; (using a computer processor, determining criteria for the recommendation; using a computer processor, querying the database using the criteria to identify second organizations and third organizations that are connected by a business relationship, wherein attribute data of the second organization or of the business relationship satisfy said criteria; using a computer processor, calculating a recommendation metric for each of the second organizations from similarity values calculated between the first organization and said third organization having a relationship with that second organization; and outputting identification data of at least a subset of the second organization, according to the recommendation metrics.

The recommendation metric for each of the second organizations may further comprise calculating a relevancy metric by comparing the criteria for the recommendation to attribute data of that second organization or of its relationships with third organizations.

The business relationships may be stored in the database as directional edges between organizations.

Preferably calculating similarity values comprises comparing attribute data of the first organization and third organizations.

Attribute data may be one or more of: industry, sector, location, product class, service class, specialization and direction of relationships;

Calculating similarity values may comprise calculating a vector distance between attribute data of the first organization and each third organization.

Calculating similarity values may comprise determining the co-occurrence of identification data of first and third organization in internet media.

Similarity values may be calculated offline and recorded in the database. Preferably only similarity values greater than a threshold are recorded in the database.

The criteria may be determined from attribute filters or keywords entered by a user.

The method may further comprise, for each second organization, aggregating and outputting attribute data of third organizations connected to that second organization.

The method may further comprise, for each second organization, outputting a text string or graphic element demonstrating a similarity between the first organization and third organizations connected to that second organization.

The method may further comprise, for each second organization, outputting identity data of one or more third organizations connected to that second organization.

According to a second aspect of the invention there is provided a recommendation system comprising a database of business relationships between organizations. The system has one or more computer processors and computer-readable media having instructions for execution by the one or more processors. When executed the instructions determine identification data or attribute data of a first organization for which a recommendation of second organizations is sought; receive, over a network, criteria for the recommendation; query the database using the criteria to return database records for second organizations and third organizations that are connected by a business relationship record, wherein attribute data of the second organization objects or of the business relationship object match said criteria; calculate a recommendation metric for each of the second organizations from similarity values calculated between the first organization and said third organization having a relationship with that second organization; and communicate to a client device over a network identification data of at least a subset of the second organization, according to the recommendation metrics.

According to a third aspect of the invention there is provided a non-transitory, computer-readable storage medium storing a database of business relationships between organizations. The database comprises a plurality of nodes, wherein each node stores identification data and attribute data about an organization. The database comprises a plurality of relationship edges, wherein each edge is connected to two nodes and records data about a business relationship between respective organizations of those nodes.

The database may comprise a plurality of similarity edges, wherein each similarity edge is connected to two nodes and records data about the similarity between respective organizations of those two nodes.

According to a fourth aspect of the invention there is provided a method of storing business relationships in a database. The method comprises creating a database graph structure of node and edge; determining identity data and attribute data for a plurality of organizations; for each organization, creating a node comprising said identity data and attribute data; receiving data defining a business relationship between two organizations and attributes of the relationship; and creating a relationship edge in the database between two nodes corresponding to the two organizations, which relationship edge comprises said attributes of the relationship.

The method may compute a similarity value between two organizations and creating a similarity edge in the database between two nodes corresponding to the two organizations, which similarity edge comprises the similarity value.

The relationship edges may be directional to record the direction of services or goods from one organization to another.

The direction may be derived from the data defining the business relationship.

It is therefore possible to create an extensive network of relationships to capture the connectedness of organizations and provide recommendations of organization that are suitable for working with a particular organization. The output provides a more personalized view of relevant organization than a mere directory.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

The invention may be illustrated by the following figures, in which like reference numerals refer to similar elements.

FIG. 5 is a display of relationship data for a particular organization.

FIG. 6 is a display of relationship data for a search result.

FIG. 7 is a diagram of a process of selecting vendors starting from peers of a searching entity.

FIG. 10 is a flow diagram of data flow and connections between software agents to output a set of vendors.

DETAILED DESCRIPTION

A system, network, and computer program are implemented to capture and query the relationships between organizations. This enables users as viewers to determine the relationships between organizations or search for an organization according to certain criteria. This also enables users as content creators to demonstrate their place and associations in the business community for viewers to analyze.

Figure 1:
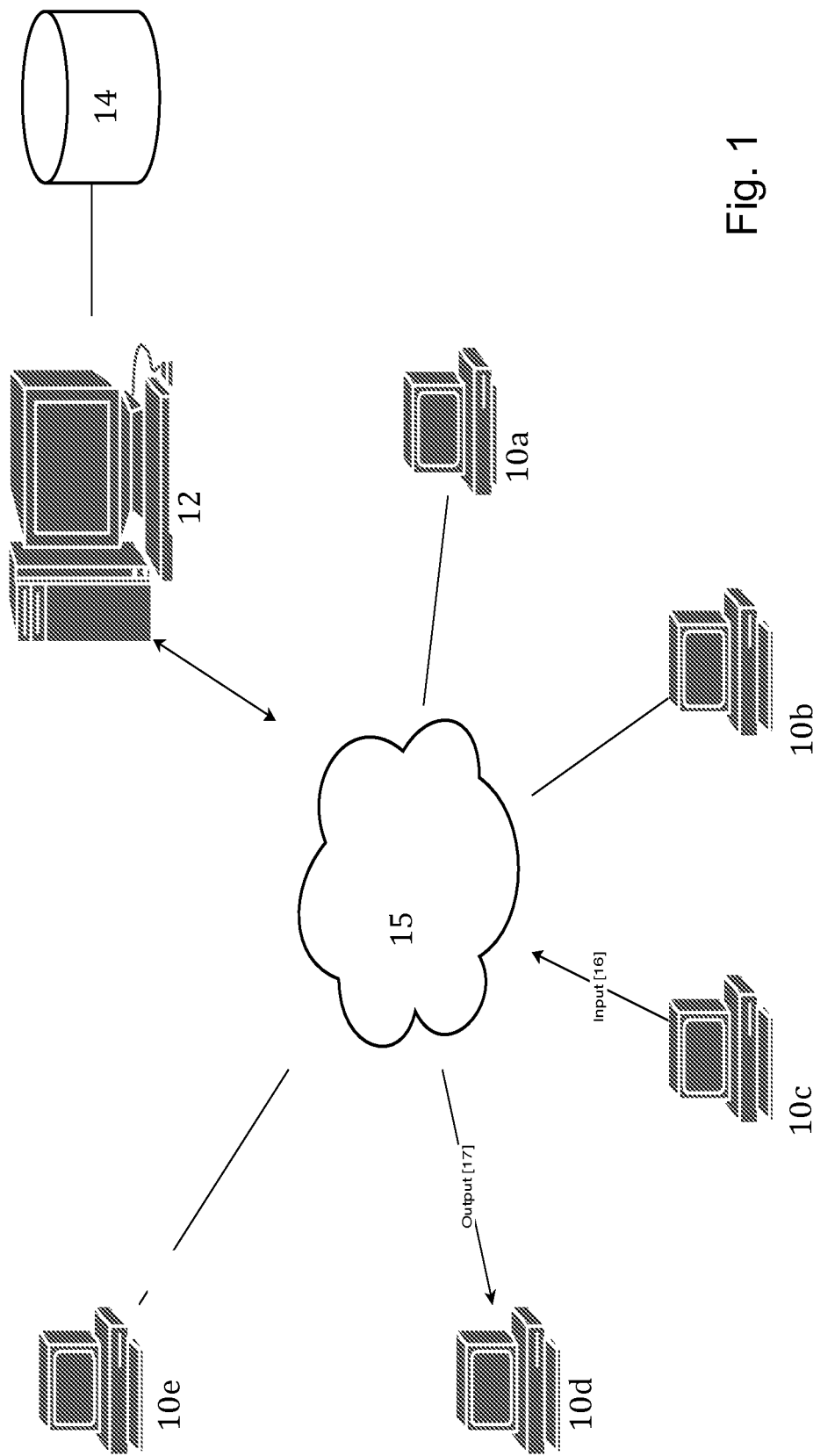
FIG. 1 illustrates a diagram of a network of computers for accessing a database of business relationships.

As shown in FIG. 1, the system may be implemented as a network 15 of interconnected computing devices 10a-e and server 12 for inputting and receiving relationship data from a database 14. The database may be a document store, relational database or graph database. Those skilled in the art of computer science will know how to implement such a database and will appreciate that there are other data structures that may be appropriate. The database 14 is connectable to user 10c for receiving data and user 10d for outputting data. The names of these devices are for simplicity of understanding and may be any computing device and each device may be used for a plurality of these roles.

In order to contain the huge data set of global organizations, the database comprises at least one million organizations and one million relationships stored on non-transitory, computer-readable storage media. Thus it is essential that the storing, querying and computational methods are performed by one or more computers. It will be understood that operations described herein as being carried out on organizations and business relationships are those carried out on the data structures and database objects representing the real-world organizations and relationships.

The server 12 may comprise one or more computer processors for reading instructions from computer-readable storage media and executing the instructions to provide the methods and agents described below. Examples of computer-readable media include disc-based media such as CD-ROMs and DVDs, magnetic media such as hard drives and other forms of magnetic disk storage, semiconductor based media such as flash media, random access memory, and read-only memory.

An organization is generally used herein to refer to a legal entity providing or receiving goods or services. While an organization may typically be a business, the term includes but is not limited to charities, corporations, sole proprietors, Non-Government Organizations, institutions, government departments, and partnerships. A business relationship is generally used herein to capture transactions between organizations to provide those goods or services. Preferably the relationship represents an agreement, which, for example, may subsist in a contract, a terms-of-business document or an ongoing understanding. Most preferably the business relationships stored in the database represent relationships that have been ongoing for at least three months or have at least three repeat instances of transactions. This is in contrast to personal relationships, non-commercial relationships, click-thru data, user website activity data, or one-off commercial transactions. Therefore the strength of the present recommendation is derived from a deep tie between organizations, as recorded in the database. An ongoing, high-value relationship is used as a proxy to suggest that one organization is a worthy supplier of goods or services.

A user is generally defined as a person who interacts with a computer, typically entering search criteria, following hyperlinks and viewing results to determine what organizations are recommended. The user is expected to be associated with a particular organization and is seeking a recommendation suited for that organization. In some cases, it is envisaged that there is no human user, and instead the database and methods will be accessed by a computer bot for displaying a relevant organization to an identified organization. For example, an ad-tech bot may determine using cookies or viewed content that a user is interested in a particular industry. The ad-tech bot could display one or more organizations or their ads to the user, depending on what organization is most relevant to the user's organization.

Figure 2:
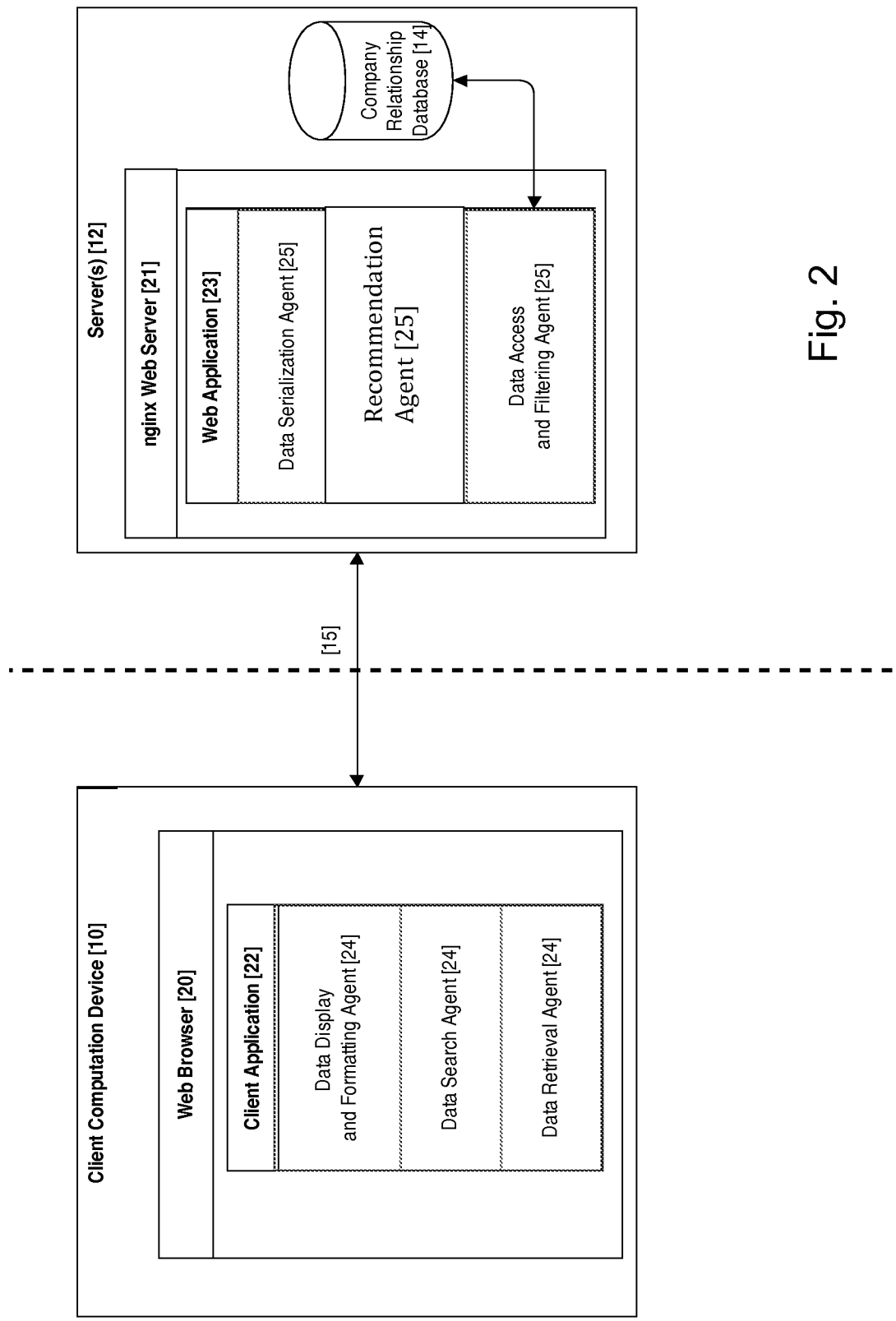
FIG. 2 is a diagram of agents for interaction between a client device and server.

FIG. 2 illustrates the interaction between a client computation device 10 and the server 12 over network 15. The device 10 may interact via a web browser 20 having an application layer 22. The application may use software agents 24 to search the database 14, retrieve output data 17 and display the data on the user's device. The server 12 may be a reverse proxy server 21 for an internal network, such that the client 10 communicates with an Nginx web server 21, which relays the client's request to associated server(s) and database(s) 14. Within the server(s) a web application 23 comprises agents 25 for operating with the database 14.

Users may access the database 14 remotely using a desktop or laptop computer, smartphone, tablet, or other computing device connectable to the server 12 by mobile internet, fixed wireless internet, WiFi, wide area network, broadband, telephone connection, cable modem, fibre optic network or other known and future communication technology.

The client device 10 may interact with the server using a web browser using conventional Internet protocols. Some or all of the methods for operating the database may reside on the server device. The client device 10 may have software loaded for running within the client operating system, which software is programmed to implement some of the methods. The software may be downloaded from a server associate with the provider of the database or from a third party server. Thus the implementation of the client device interface may take many forms known to those in the art. Alternatively the client device simply needs a web browser and the web server 12 may use the output data to create a formatted web page for display on the client device.

The methods and database discussed herein may be provided on a variety of computer system and are not inherently related to a particular computer apparatus, particular programming language, or particular database structure. In preferred embodiments the system is implemented on a server. The term 'server' as used herein refers to a system capable of storing data remotely from a user, processing data and providing access to a user across a network. The server may be a stand-alone computer, mainframe, a distributed network or part of a cloud-based server.

Figure 3:
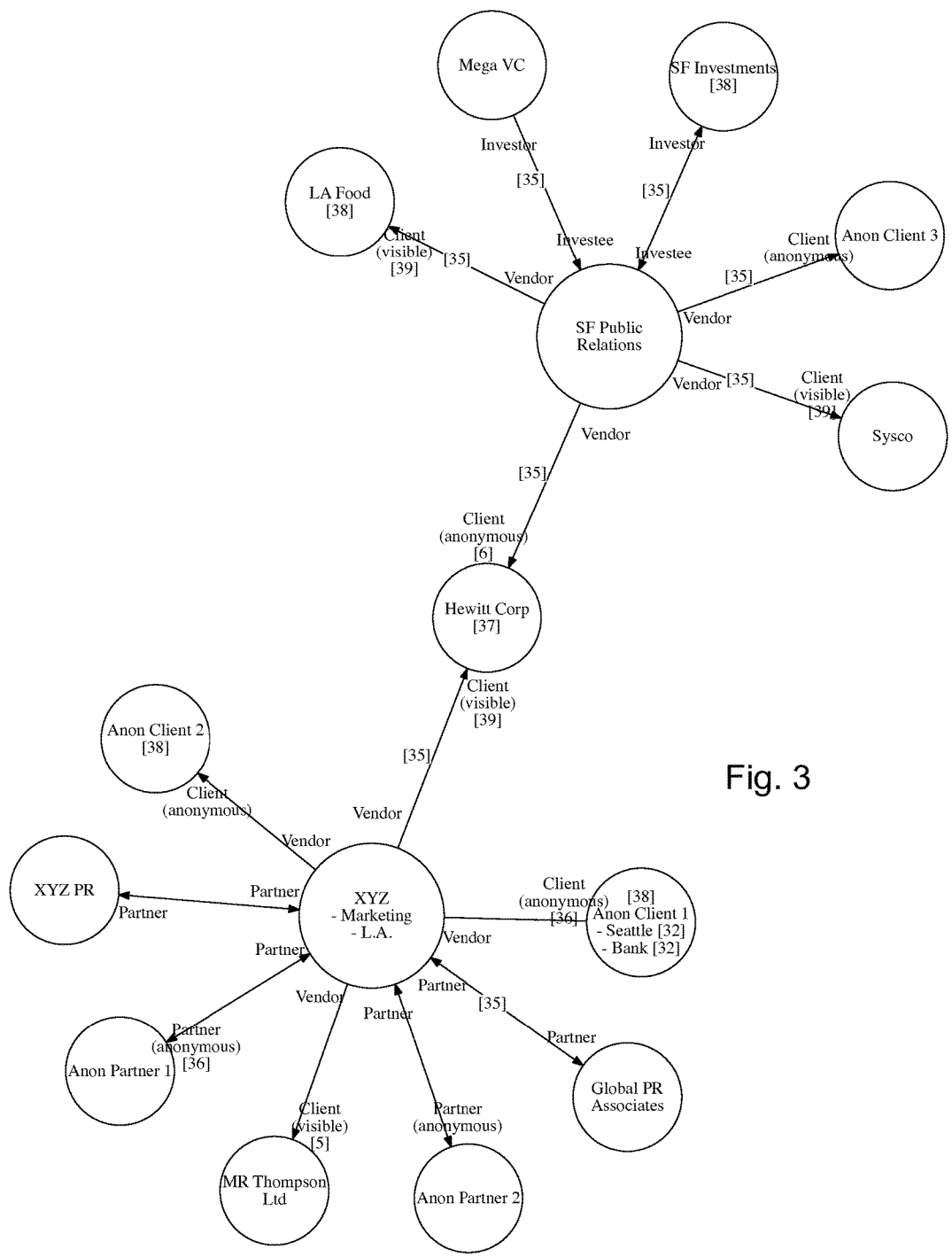
FIG. 3 is a diagram of example relationships in a database.

As conceptualized in FIG. 3, the database is structured to record a plurality of relationships 35 with data about the relationships such as the nature of the relationship, attributes 32 about the organizations 38, and identification data (such as a name).

There may be only one relationship recorded for an organization but in most cases there will be many. The database preferably comprises millions of organizations and relationships.

The nature of the relationship may be displayed textually or graphically. The direction is indicated graphically in FIG. 3 using an arrow from the supplier of goods or services to the receiver.

As shown in this example, fifteen nodes 38 representing organizations are interconnected via fourteen relationships 35, indicating which organization in the relationship is a client, vendor, investor, partner, etc.

In contrast to other social networks storing mutual, non-directional connections (friend-friend, associate-associate, classmate-classmate), the present database and system are arranged to record the nature of relationships and their direction, for example, as indicated by the flow of goods and services from a first organization to a second organization. For example the direction may be unidirectional in the case of buyer-seller or bidirectional in the case of a partnership. This creates added complexity to the database but provides more information to viewers and creates additional search criteria.

For example, two banks may be peers to a user's organization that is looking for legal services, but the bank that receives legal advice from a law firm is more relevant than the bank that provides financial services to that law firm.

By way of example, the nature of the relationship may be described in general terms: vendor-client, provider-receiver, buyer-seller; or in specific terms: partners, client-advisor, manufacturer-assembler, designer-distributor-retailer, joint venture, client-service provider, investor-investee, parent-subsidiary.

Alternative terms will occur to the skilled person as appropriate descriptions of a business relationship.

A relationship record may include relationship attribute data giving further details such as the good and services, time frames involved, investment amount, product type, sales amount, or terms of the contract. For example, "XYZ has sold reagents to NY Biotech Ltd since 2008, on a non-exclusive basis". This relationship attribute data provides the user with in-depth understanding of how each organization operates in the business community.

The system may be operated as a social network or online community wherein numerous users input numerous relationships between numerous companies. This allows users to share information with other users. Such sharing on social networks has been found to encourage the connectees to become users themselves and input their own relationships with existing users or potential users, such that the total number of records expands exponentially.

Database Format

The database may be implemented in a variety of ways known within computing science, such as a document store, object database, relational database or graph database. Depending on the schema used the data about an organization may be called an object, a record or a node. Generally these may all be called a 'data collection' to capture the concept of a group of data elements associated with an organization without reference to a specific data schema.

Figure 4:
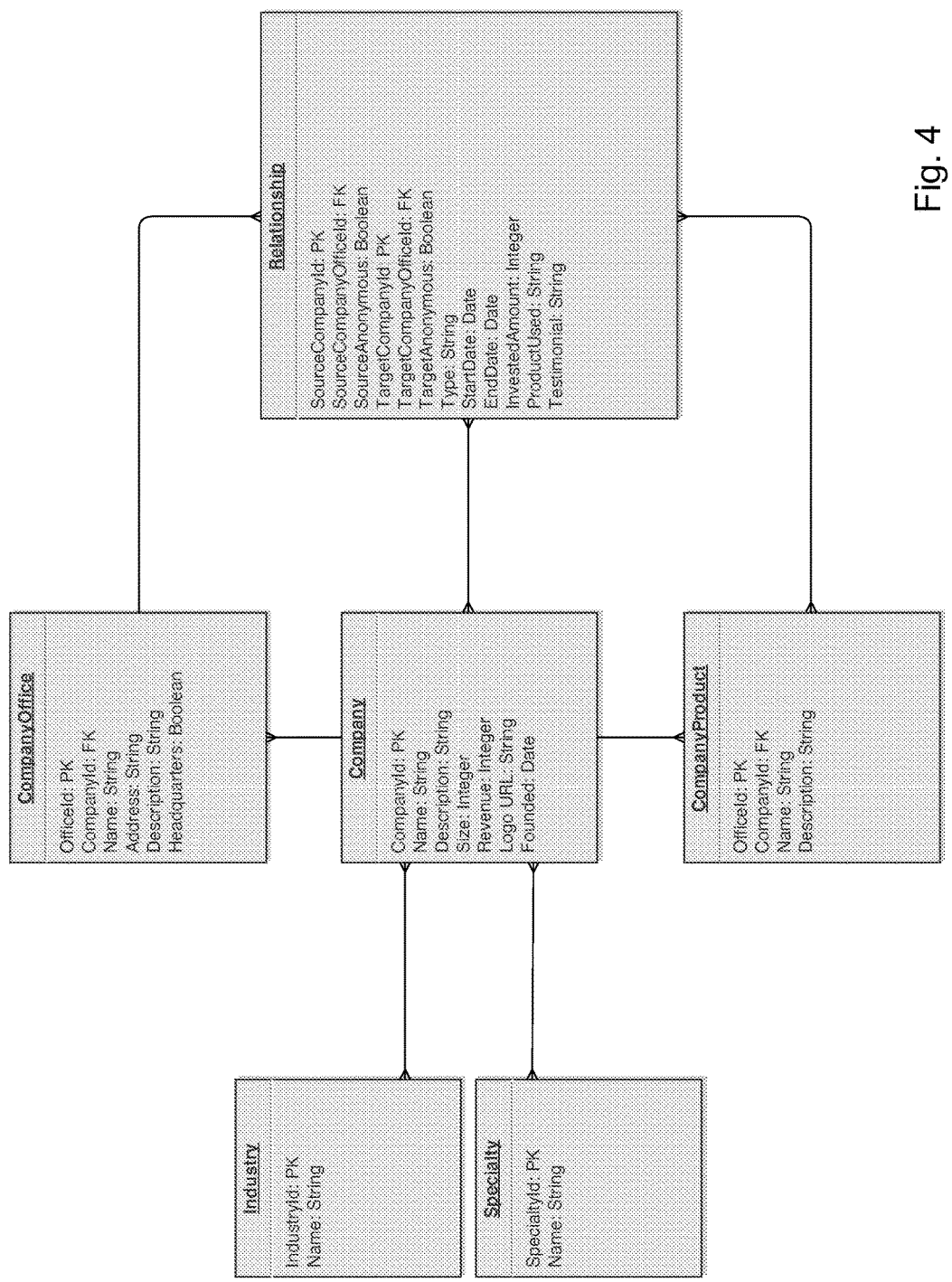
FIG. 4 is a diagram of a database structure for relationships and organizations.

In preferred embodiments, a graph database is used, wherein organizations are stored as nodes and business relationships are stored as edges. This is illustrated in FIGS. 3 and 4 by solid lines between organization circles with arrows to indicate the direction of the flow of goods or services from a vendor to a client.

The graph may comprise a second type of edge (similarity edge), which records the degree to which one is similar to another. The similarity edge may be non-directional or bidirectional to indicate that two organizations are mutual peers or the peer edge may be unidirectional to indicate that one organization is considered a peer of another organization but not vice versa, or at least not in the same way or degree. There may be more than one similarity edge between organizations to capture the different degrees or ways that two organizations are similarity.

Figure 9B:
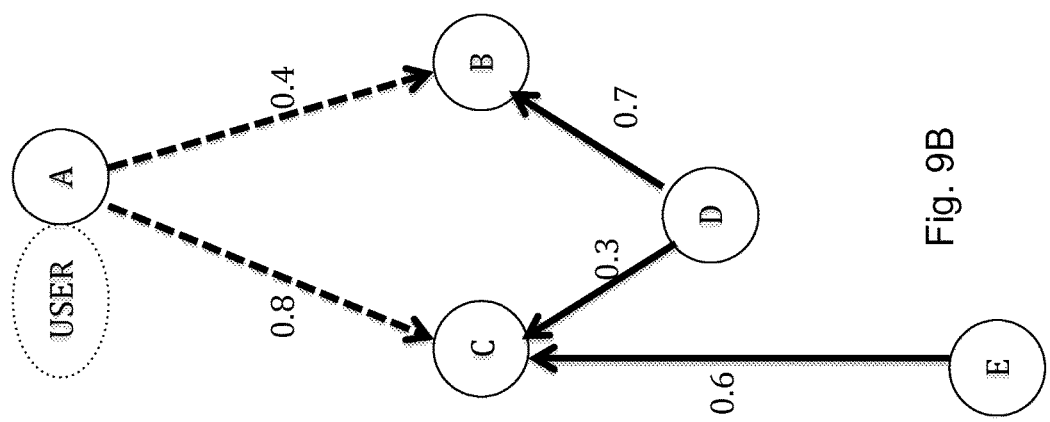
FIG. 9B is a diagram of a graph structure showing connections relevant to a search and their weightings.
Figure 9A:
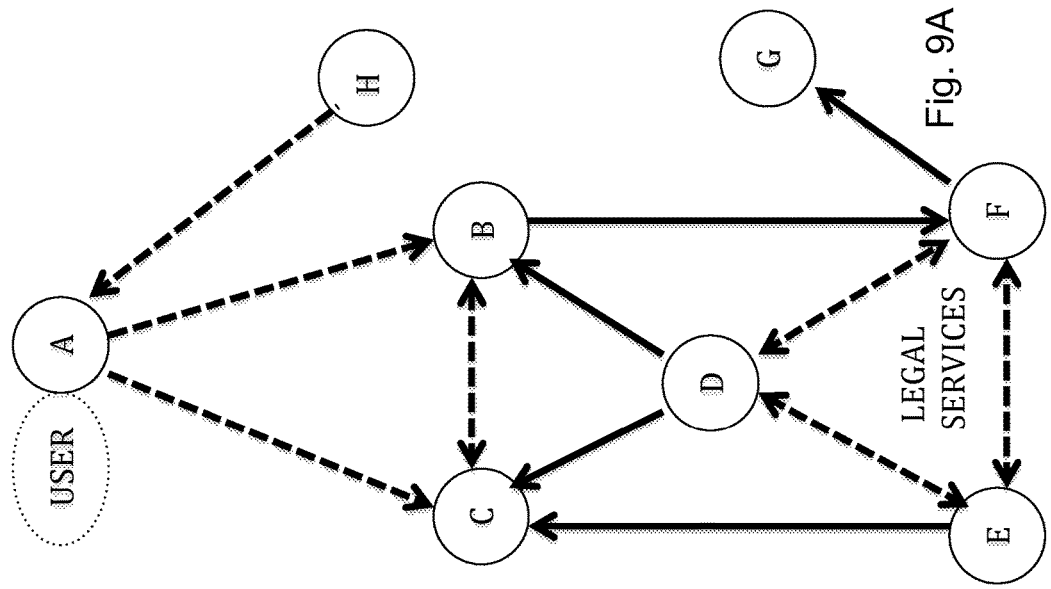
FIG. 9A is a diagram of a database graph structure.

FIG. 9 illustrates a small portion of an example graph, focusing on the nodes and edges between a user's organization node (A) and vendor nodes (D, E, F) being sought. USER is associated with organization A. Solid arrows indicate relationship edges as the flow of services from a vendor node towards a client node. Dashed arrows indicate similarity edges from one organization towards an organization recorded as similar. Thus D, E and F are mutual peers and are, in this case, the target of the search. Nodes C and B are similar and both are similar to A. Node and edge values are shown separately in FIG. 9B.

The database may be arranged as a number of tables such as a table of relationship records, a table of companies, a table of industries, a table of company products, a table of specialties, and a table of company offices. Other tables may be added providing additional information linkable to the other tables. The tables may contain references to other tables for the purpose of building a complete relationship or profile, without having to replicate all data in every relationship.

For example, a relationship record comprises references to each organization and data about the relationship including whether either organization is recorded as anonymous. The organizations' data can be found in the respective records of the company table.

Data about the source and target companies are stored in another table and further attributes may be stored in further tables linked to records in the company table.

Thus a complete relationship can be determined by collating data from relationship records, associated company records and associated attribute records. A computer process may select relationships according to the search criteria.

In one embodiment, a relationship is assembled for output by searching the relationship table for a value (e.g. company name or relationship attribute) in one or more fields. When a matching relationship record is found, a first organization code is used to locate that organization in the company table, and a second organization code is used to locate that organization in the company table.

FIG. 4 illustrates an example relational data scheme showing the connections between tables, fields of each record in each table and data type for each field. The complete relationship to output is an assembly of data from the connected records.

In this example, there are additional tables storing data about industries (e.g. banking, manufacturing, food), specialties (investment banking, injection moulding, weddings) and products (e.g. stock transaction, toys, cakes). Such tables store data such as names of each industry and hierarchies between them.

In an alternative data scheme, complete relationships are stored as a table where each relationship record comprises fields for the first and second organization, the nature of the relationship and attribute data for each organization. This allows a relationship to be contained in a single record without the need for pointers to other tables but does require redundant storing of organization attribute data for each record.

Data Source

Data may be input by an organization to the relationship or by a third party using manual or automated means. In one embodiment, a person or web crawler scours the webpages of organizations and/or organization news providers to find relationships between organizations. At the same time data about the organizations can be recorded.

The system stores data for organizations in the database, which can be used to find or compare organizations depending on the nature of the data. The data may be divided into different categories.

Identification data enables the system to identify the organization. Identification data includes data such as legal name, parent company name, CEO's name, office address, IP address, logos, brand names, or company registration number.

Profile data provides information about the organization's history, expertise, and accomplishments, possibly in an unstructured text format.

Attribute data describes properties of the organization using categories or values, but do not identify the organization. The attribute data may be sorted and classified according to a structure with defined terms. Attribute data includes classes and values such as industry, sector, general location, specialization, product class, service class, number of employees, funding stage, age, market capitalization, field of practice, or revenue.

Organization type data is a subset of attribute data for describing the function of an organization and includes classes such as industry, sector, specialization, product class, service class, or field of practice.

Similarity

The personalization of the recommendation is based on determining what organizations are connected in a relevant way to peers of a user's organization. It is possible that some peers to one organization are not peers to all other members of that peer group or they may have additional peers not in that peer group. An organization that provides two distinct services will have two sets of peers, whereby members of each set may not consider the other set to be in their own peer group. Alternatively a similarity metric may be calculated between every organization in the database. This is computationally expensive and so this calculation is preferably processed offline and stored in the database. Preferably the processor only records similarity edges that are greater than a threshold similarity, so as to reduce the need to store data for minimally similar organizations.

In some cases, the user's organization will not have been recorded in the database with similarity edges to any known peers. In this case, similar or peer organizations are determined in real-time with the recommendation. Rather than calculate peer values for all organizations with the user's organization, it is computationally more efficient to determine a set of organizations (clients) that receive goods or services from organizations (vendors) that are relevant to the search criteria and then calculate a similarity or peer score between each selected client and the user's organization.

A similarity edge may comprise a value measuring the degree of similarity or relevance. Alternatively or additionally, similarity edges may be recorded as either TRUE or FALSE. The similarity edge may comprise a text or code indicating the nature of the similarity (e.g. "small biotech peers", "large banks", "subsidiaries of XYZ Corp"). The nature of the similarity may be output to a user to indicate how organizations are similar.

In preferred embodiments, similarity between two organizations is calculated using multiple algorithms, which consider different factors such as attribute data and co-occurrence in media. The scores from these algorithms are weighted and combined to reach a similarity value.

As used herein, the terms 'similar' and 'peers' are related. Organizations may be considered similar because they have many attributes in common. Peers are similar with the added provision that they are in the same or related industry/sector/specialism and/or offer related products or services. Thus two organizations that have similar attribute data for size, location, and age are considered similar but may not be considered peers if they have different organization type data such as industry or sector. Two organizations in the same industry are considered peers, and comparing attribute data, such as revenue, location, and specialism, can further refine the peer score. The skilled person will appreciate there are many known algorithms to calculate similarity metrics and/or perform peer clustering using attributes. For example, similarity metrics could be based on Jaccard similarity coefficients or cosine distance, and peers could be clustered using expectation maximization, hierarchical clustering or density-based clustering algorithms.

Alternatively or additionally, similarity can be determined by co-occurrence in journals and social media. This can be done by searching for names of two organizations or their products appearing in the same individual blog, microblog or industry journal article. Co-occurrence can also be found by noting the frequency with which people view both organizations in a session. The co-occurrence approach is inherently less quantifiable but has the advantage of crowd-sourcing to determine which organizations are actually perceived as peers or similar.

Classification

An organization may be described according to an infinite array of properties, using a huge variety of terms, many of which are synonymous. In order to group together similar companies and tabulate attribute data it is useful to use consistent, defined terms or ranges. Company A may be a baker located in San Jose and have 8 employees. Company B may be a café in San Francisco and have 5 employees. Both may be classified as companies in the retail food and drink sector, located in the San Francisco Bay Area with less than ten employees. This significantly reduces later processing times because there are now a limited number of attribute types to compare.

The database preferably comprises a data structure having a limited number of classes and ranges and, for each class, a limited number of standard terms. A classifier agent comprises means to classify data about an organization into a plurality of classes and ranges and store them in the database. For example the classifier may be a Decision Tree, Random Decision Forests, or Naïve Bayesian Classifiers available from machine learning tools such as SciKit Learn or Weka. For each standard term there is a vocabulary of synonyms. The classifier parses through an organization's profile data or scrapes the organization's webpage or other records for phrases and terms that are likely to be descriptive of the organization. These phrases and terms are compared to the vocabularies to determine the most suitable category and standard term. The standard terms are applied to the record in the database for that organization as its attributes. Tools such as WordNet or algorithms based on co-occurrence statistics enable an algorithm to automate such synonym discovery to classify terms.

The system may employ a search engine, which uses the vocabulary lists to hash a user's free-text search string to the equivalent standard term for an attribute. For example, a search for 'a patisserie in the Bay' would lead to 'patisserie' being matched to the standard term 'baker', whilst the term 'Bay' is matched to more than one location. The method would return all organizations having the attribute 'Baker' with locations associated with San Francisco Bay, Bay of Fundy, Bay of Biscay, etc.

Many classes and ranges may have one or more parent classes or ranges, such as the NAICS system used to classify industry. For example, a winery could be classed in the Food and Beverage sector, the Beverage subsector, Alcoholic Beverages group, or the Wine Manufacturing subgroup. Moreover many companies may have attribute data in more than one class, such as the largest blue chip companies that serve many sectors, have products in different classes, and have subsidiary companies with very different employee counts. The database is preferably arranged to store sufficient attribute data to describe the organizations and the system comprises software agents to classify and compare organizations across a plurality of attributes and levels.

Recommendation Engine

A request to view data from the database may take the form of a search string or clicking on a hyperlink or filter button for an attribute or name. The request may come indirectly via a third party link or search results. A request to view data about a particular organization may be answered by returning an organization's profile webpage. The present organization recommendation engine accepts such requests and returns a set of matching and recommended organizations with context that is offered as relevant to the user's organization The recommendation engine is a system comprising a database, processors, and software to provide a personalized recommendation of an organization for another organization. For simplicity, in the discussion hereafter, the entity for which a recommendation is sought shall be referred to as the user's organization (aka first organization), the organizations being sought shall be referred to as vendors (aka second organizations), and organizations receiving goods or services form the vendors shall be referred to as clients (aka third organizations). This supposes that a user wants to know from what vendors he should buy goods or services based on what clients use that vendor and are similar to the user. It will be appreciated that the search is not always directed at finding a vendor and that the organizations connected to a vendor are not always clients in the relationship. It will also be appreciated that the system will be used by an employee, automated search tools or a broker to search on behalf of the first organization.

As illustrated in FIG. 6, a user interfaces with the recommendation engine and provides identification or attribute data about the searching organization, criteria about the organization being sought 102 and any filter criteria 103 that they wish the engine to consider. The output is a data set of recommendations 115, optionally including a score or ranking for each organization.

Using keywords or selecting hyperlinks, the user indicates one or more criteria for the search of second organizations. Preferably the criteria are directed to organization type data. Examples of organization type data for a law firm include: law firm; lawyers; specializing in contact negotiation; and legal services. Whereas size, revenue, and location are examples of attribute data that would not indicate the type of an organization, they could be used as criteria to refine the search, either as an input with the organization type criteria or selected during a subsequent step. The engine retrieves a set of data collections of second organizations from the database that match the criteria.

In order to personalize the recommendation of second organizations, the engine determines or receives identification data for the first organization or at least some attribute data for the first organization. In one embodiment, the engine receives data identifying the user's organization such as name, web domain, email address, IP address, or company registration number, etc. Preferably a user logs into a web portal accessing the recommendation engine with a company name or company email address. Alternatively identification may be determined by looking up the owner of the IP address of the user. Identification data can be used to determine attributes of the first organization, either with reference to the database or by scraping data from the Internet in real-time. Attribute data is used in similarity algorithms as discussed above. The identity data, if available, is further used to calculate similarity based on co-occurrence of organization names in media.

Users who wish to remain anonymous or wish not to log in may still receive a personalized recommendation by describing their organization. The description preferably includes attribute data, preferably organization type data, which could be entered as text or through menus on the interface. Example descriptions include: small business, London, $40 m revenue, hotel management, conference services.

The recommendation engine retrieves a set of data collections of third organizations from the database that are similar to the user's organization or have a relationship with one of the second organizations that is relevant to the criteria.

For the purpose of the recommendation, the database can now be seen as reduced to a set of data collections of second organizations, a set data collections of third organizations, and relationship data between second and third organizations. The engine may create the recommendations from the sets in at least two ways, as illustrated by FIGS. 7 and 8, or using combinations thereof.

In a first embodiment illustrated by the flow diagram of FIG. 7, the engine determines all the organizations 105*a* in the database that are peers of or similar to the user's entity. The engine then finds relationships (106*a*) in the database for each organization 105*a* and creates a set of potential vendor organizations. The engine determines whether each of these organizations matches the organization type being sought to create a set of second organizations 107*a*.

Figure 8:
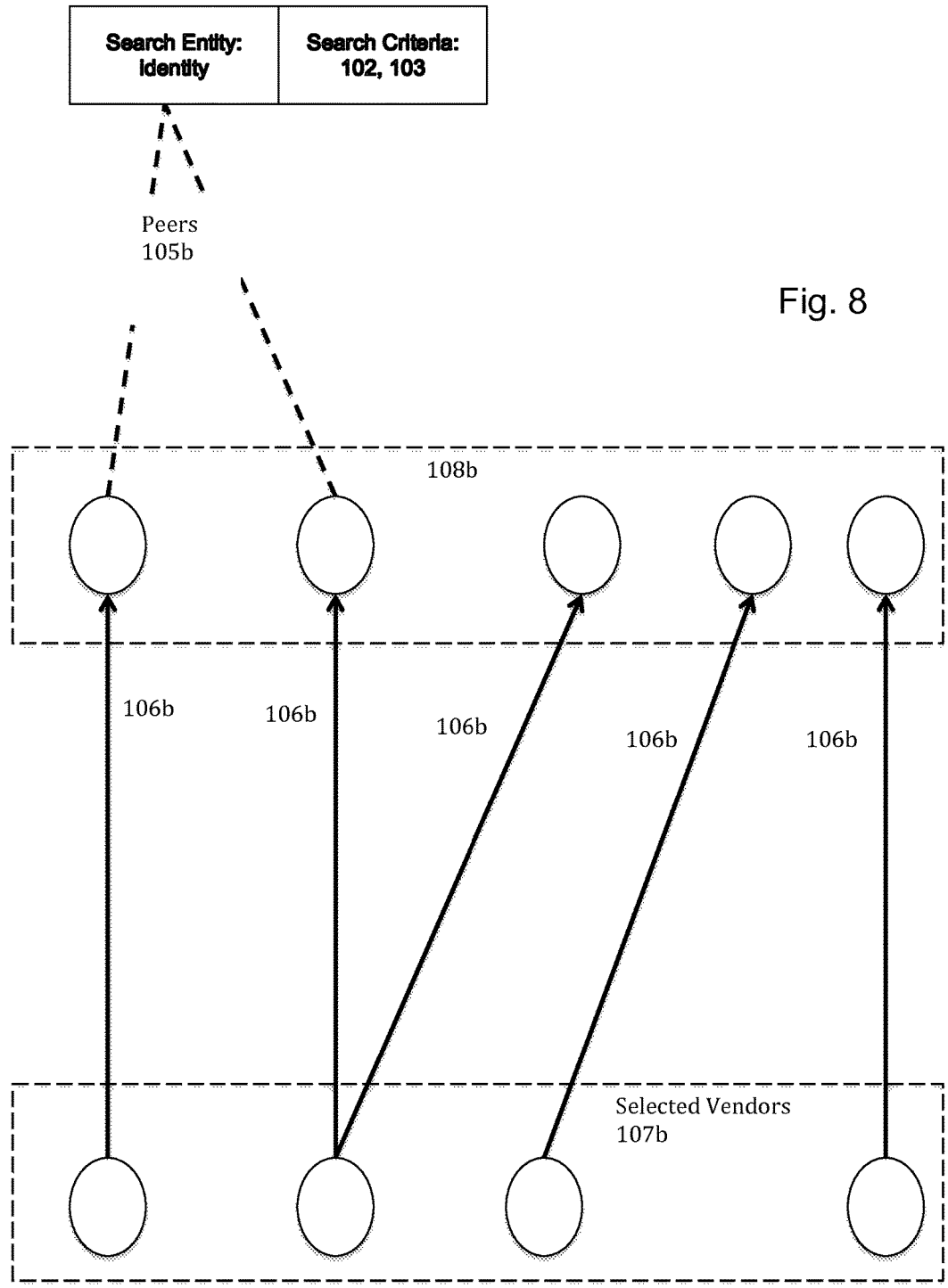
FIG. 8 is a diagram of a process of selecting vendors starting from vendors matching certain search criteria.

In another embodiment illustrated by the flow diagram of FIG. 8, the engine determines which organizations in the database match the organization type being sought to create set 107*b* of vendors (second organizations). The engine then finds all relationships 106*b* in the database for each vendor to create set 108*b* of clients (third organizations). The engine may use the relationship direction attribute stored in the database to ignore connected organizations that are not actually clients to each vendor or use this knowledge to weight their relevance. Thus for recommending a vendor, the suppliers to that vendor are ignored or lowly weighted compared to clients of that vendor.

The engine then determines which clients 108*b* are peers 105*b* of or similar to the user to create a set of third organizations.

The engine thus creates vendor set 107*a* or 107*b*, which may well be different and creates client/Peer set 108*a* or 108*b*, which may well be different. In general sets generated by the route of FIG. 7 will be smaller than those generated by the route of FIG. 8. For example 108*a* will contain clients that are also peers, whilst 108*b* will contain all clients, some of which will not be peers. In a mixed embodiment, the engine may start with one route to create sets and then iterate to amend the sets using the other route. For example the Engine may create a set of peers, determine relevant vendors connected to peers, then create a set of all clients of those vendors. Some of the clients will be the original peers and very relevant to the user's organization whilst others will now be non-peers but may still included in calculating a recommendation metric.

Potentially the sets may be very large for crowded industries with many recorded connections. Through a web interface, the user may be offered a selection of filter criteria for each set (clients and vendors) to exclude or limit the set of output vendors. For example the engine may exclude certain clients under a certain size or limit the output to vendors at certain locations. The user may also be able to filter on the names of vendors or client. Thus the Engine provides means of filtering the output vendor set based on attribute data and identity data of clients and/or vendors. Filtering may be performed at any stage. For example, having received 500 vendors, each with 100 clients, a user may choose to limit the displayed data to vendors with more than a threshold revenue amount, located in New York, and whose role in the relationships is as supplier of cosmetics.

The set of vendors may be output as an unordered set of all vendors suited for the user. To provide a more personalized view to the user, the engine preferable processes the vendor set according to a metric, such that a subset of vendors is output corresponding to the most relevant or highest scoring vendors.

In one embodiment, the engine uses the metric to determine whether each vendor is more or less suitable than another to output an ordered set of vendors.

In another embodiment, the engine computes the metric as a score for each vendor and outputs the vendors according to the scoring and optionally outputs the score itself.

It is also possible to combine the above methods. For example the engine may calculate a rough score to order the vendors, then perform direct comparisons between close scoring vendors, and then limit the output to only the top ten vendors.

The personalized recommendation metric may be calculated as a vector distance using attributes of first, second and third organizations to determine the second parties closest to the first party. The metric may also be calculated as a sum of weighted relationships or similarities to determine the highest score for each second organization.

The engine may calculate the recommendation metric for each vendor based on the sum of similarity values between the user and each client of that vendor. The engine may compare attribute data of these organizations as discusses elsewhere. The recommendation metric may be amended by multiplying each similarity value by a relationship value, which indicates the strength of the relationship between second and third organizations. The similarity and relationships values are preferably stored as attributes of the respective edges in the database. These values may be TRUE/FALSE but preferably are weighted to indicate more or less similarity or relationship strength.

The engine may amend the recommendation metric by calculating a relevancy metric based on the relevance of attributes of second organizations to the criteria for the recommendation. Preferably this calculates the relevance metric based on the organization type of the vendor and the type of organization sought. For example a shipping company is considered more relevant to the criteria of "shipping services" than a law firm that provides legal service to the shipping industry. The reverse recommendation would be made if the criteria were, "services to the shipping industry". Therefore a search term may be contextualized and hashed to an appropriate organization descriptor, which is then compared to the appropriate attribute data stored with the vendor or relationship.

Returning to FIG. 9, a search for legal services (matched by nodes D, E, F) yields the reduced graph representation of FIG. 9B. This shows the core recommendation data needed to provide a personalized recommendation to organization A, where only peer edges from A to peers (B, C) and relationship edges from matching vendors (D, E) to client nodes (B, C) are considered. The weights of the edges are shown here for calculations below.

The result in FIG. 9B may be derived by starting from all matching vendor nodes (D, E, F), following all outward relationship edges to determine their client nodes (G, B, C), and then following all inbound peer edges from those client nodes to determine the peers (B, C) of A, for whom the recommendation is intended. Alternatively or additionally the same result may be derived by starting from A and following all outbound peer edges to find peer nodes (B, C) and then follow all inbound relationship edges from peers to find matching vendor nodes (D, E).

A personalized recommendation for organization A is made by calculating a metric for each vendor as the sum of the weighted paths from A to D and E, whereby:

Score $D=0.3\times0.8+0.7\times0.4=0.52$ and Score $E=0.6\times0.8=0.48$

The skilled person will appreciate that alternative algorithms and weightings may be used to calculate a metric for each vendor within the spirit of the invention and the invention is not intended to be limited to any particular algorithm.

Optionally the recommendation engine may supplement the personalized recommendation by including vendor nodes that do not have paths to peers of the user's organization. In FIG. 9, vendor F is does not supply services to a peer of A, notwithstanding that it receives services from a peer of A, and so does not score on the personalized system. However, it could nonetheless be output to the user as a vendor matching the search criteria, but with a lower rank than vendors D and E.

FIG. 10 is a flow diagram showing the flow of data and connections between software agents according to one embodiment. It is related to the process shown in FIG. 8 but the skilled person will appreciate that the agents may be re-ordered to determine peers of the user's organization before vendors, as illustrated in FIG. 7.

In FIG. 10, a remote device 10 makes a query based on criteria 102, 103 on behalf of an organization (shown as the user's org here). The criteria data is sent to a receiving agent 120 to find vendors from the database 14 that match the criteria. The database returns data about matching vendors 107, their clients 108 and the relationships between them. The identification data is sent to an attribute agent to find the attributes of the user's organization from the database.

For each vendor, the recommendation metric agent 130 calculates the sum of similarities between attributes of clients and the user's organization. A ranking agent 135 then compares the metrics for each vendor to determine an order to the vendors for the purpose of this user's organization. The output agent 140 determines how many of the vendors to output and what data, such as aggregated client attribute data and vendor attribute data, should accompany each vendor. The output data is sent to the device requesting the recommendation.

Displaying Data

In an example illustrated in FIG. 5, a webpage 70 is displayed in response to a request to see information related to company 'XYZ Marketing'. The webpage displays the company's profile in a text string, graphic elements and the aggregated attributes of its clients. The webpage displays that 'XYZ' supplies 34 clients, wherein twelve are located in Vancouver and eight are located in Seattle (and therefore some locations are undisclosed). Certain named clients are identified.

Certain quantifiable attribute data may be aggregated and displayed as graphs and charts. For example, for each second organization the total number of connected third organizations in each sector or location could be tallied and displayed to help the user make a meaningful interpretation of the results. Whilst the name of a connected organization may make clear the nature and relevance of a relationship, in many cases it is sufficient to understand an organization's business by evaluating how many connected organizations are in a certain sector or location. Alternatively or additionally, for each second organization, the attribute data is aggregated and displayed as a natural language statement about the third organizations.

FIG. 6 is an example webpage displaying results from a search for public relations firms. The user interface may enable the user to search by keywords and attribute filters to select the most relevant criteria. Preferably the filters relate to divisions within each attribute to simplify and group the options for searching. As shown, the user can filter on specialty, location, industry and size.

In this example, three companies are highlighted with details. A summarized profile of each organization is provided with hyperlinks to each organization's main profile page. Different attribute data may be displayed depending on which classes of attribute have the highest aggregated count for each second organization and depending on the attribute's relevance to the user's organization.

In some cases not all of the matching records will be selected. For example, the program may select the first 50 relationship records for a particular organization or select only those relationships for a searched organization which are deemed significant, in terms of value or quantity or appear more relevant to the user's organization.

The method may not output all data for all second organizations of all relationships selected. The method may limit the output to a predetermined number of identified organizations and/or attributes or choose which organizations or attribute data to output. This is useful in reducing the data stream to be transmitted or displayed on a screen to a manageable amount. For example, the connections for a large company may involve thousands of relationships and organizations so the program may choose to output only certain connected organizations and certain attributes that are most numerous or deemed most relevant. FIG. 8 illustrates that in addition to the three displayed companies, 20 more results exist (that are not displayed).

The method may be used to output data to create a profile page for a particular organization or attribute and these pages are stored for subsequent retrieval by a user. In this case the method can be performed offline.

The above description provides example methods and structures to achieve the invention and is not intended to limit the claims below. In most cases the various elements and embodiments may be combined or altered with equivalents to provide a recommendation method and system within the scope of the invention. It is contemplated that any part of any aspect or embodiment discussed in this specification can be implemented or combined with any part of any other aspect or embodiment discussed in this specification. Unless specified otherwise, the use of "OR" between alternatives is to be understood in the inclusive sense, whereby either alternative and both alternatives are contemplated or claimed.

For the sake of convenience, the example embodiments above are described as various interconnected functional blocks. This is not necessary, however, and there may be cases where these functional blocks are equivalently aggregated into a single logic device, program or operation with unclear boundaries. In any event, the functional blocks can be implemented by themselves, or in combination with other pieces of hardware or software.

While particular embodiments have been described in the foregoing, it is to be understood that other embodiments are possible and are intended to be included herein. It will be clear to any person skilled in the art that modifications of and adjustments to the foregoing embodiments, not shown, are possible.

What is claimed is:

1. A non-transitory, computer-readable storage medium storing
    (a) a database of business relationships between organizations, the database comprising: a plurality of nodes, wherein each node stores identification data and attribute data about an organization; a plurality of relationship edges, wherein each edge is connected to two nodes and records data about a business relationship between respective organizations of those nodes,
    (b) an aggregate table comprising a set of first nodes and, associated with each first node, a plurality of aggregates counts for a corresponding plurality of attribute values, wherein each count is the number of second nodes connected by relationship edges to the corresponding first node and having the relevant attribute value.

2. The medium of claim 1, wherein the database further comprises a plurality of similarity edges, wherein each similarity edge is connected to two nodes and records data about the similarity between respective organizations of those two nodes.

3. The medium of claim 1, wherein the relationship edges are directional to record the direction of services or goods from one organization to another.

4. A method of storing business relationships in a database comprising:
    creating a database graph structure of node and edge;
    determining identity data and attribute data for a plurality of organizations;
    for each organization, creating a node comprising said identity data and attribute data;
    receiving data defining a business relationship between two organizations and attributes of the relationship; and
    creating a relationship edge in the database between two nodes corresponding to the two organizations, which relationship edge comprises said attributes of the relationship.

5. The method of claim 4, further comprising computing a similarity value between two organizations and creating a similarity edge in the database between two nodes corresponding to the two organizations, which similarity edge comprises the similarity value.

6. The method of claim 4, wherein the relationships edges are directional and store the direction of goods or services from one organization to another organization, which direction is derived from the data defining the business relationship.

7. The medium of claim 3, wherein the relationship edge is directed from the first nodes to the second nodes by a client-vendor edge.

8. The medium of claim 1, wherein the aggregate table is derived from the database.

9. The method of claim 6, further comprising updating an aggregate table for at least one of the two nodes, for attribute values of the other of the two nodes.

* * * * *